Patented Apr. 29, 1952

2,594,453

UNITED STATES PATENT OFFICE 2,594,453

DETERGENT COMPOSITIONS

Milton Kosmin and Jay C. Harris, Dayton, Ohio, assignors to Monsanto Chemical Company, St. Louis, Mo., a corporation of Delaware No Drawing. Application April 1, 1950, Serial No. 153,491

5 Claims. (Cl. 252—140)

The present invention relates to detergent compositions.

It is an object of the present invention to provide detergent compositions capable of producing improved washing effects without the production of substantial amounts of foam. It is a further object to prepare detergent compositions stable to alkalies.

The compositions herein-disclosed are particularly adapted for use in automatic washing machines, especially in the closed type of washer, because of the above-mentioned almost total absence of suds. It has been found that the use of the ordinary sudsing type of detergent in such machines results in a somewhat decreased efficiency due to the mechanical blanketing of the top of clothes by the excess amount of suds. Moreover, due to the marked tendency to foam of the present detergents, it is possible to increase the speed of the agitator or spinner, resulting in an increase in washing efficiency.

The present compositions are produced by reacting tall oil with ethylene oxide in amounts such that at least 0.5 part, but less than 2.3 parts of ethylene oxide are condensed per part of tall oil and then from 15 to 30 parts of the condensation product thus obtained are combined with from 20 to 50 parts of a sodium phosphate selected from the class consisting of trisodium phosphate, sodium tripolyphosphate, tetrasodium pyrophosphate, sodium hexametaphosphate, and mixtures thereof, from 20 to 40 parts of a non-phosphate salt selected from the class consisting of sodium carbonate, sodium sesquicarbonate, sodium sulfate, sodium borate, and mixtures thereof and from 0.1 to 5 parts of carboxymethylcellulose. The tall oil employed in forming the above condensation product may be either crude or refined.

In the above composition in which the parts are by weight the phosphates and other salts may be employed in the anhydrous or hydrated form. However, when in the hydrated form allowance should be made for the amount of water contained therein in order to maintain the ingredients when dissolved in water within the effective range of proportions disclosed and claimed.

The condensation of ethylene oxide with tall oil may be carried out at any temperature above the melting or solidification point of the tall oil. Generally, a temperature above 130° C., but below 190° C. is suitable for the condensation reaction. If desired, a catalyst such as potassium hydroxide may be employed in order to accelerate the condensation.

The detergent compositions herein-disclosed were evaluated by the standard Launderometer procedure described by Jay C. Harris in Soap and Sanitary Chemicals for August and September, 1943. The "hard" water employed had a hardness of 300 parts per million. The "soft" water had a hardness of 50 parts per million. The detergent was employed in a concentration of 0.2% by weight. However, instead of reporting the results as per cent of soil removed, as described by Harris, the effectiveness of the detergent composition is compared with that of Gardinol WA (the sodium sulfate of cocoanut oil alcohols), the detergency value of which is taken as 100%. Accordingly, the detergency results herein-described are referred to as "relative" detergency in view of the comparison of the observed detergency with that of a standard detergent.

The following examples are illustrative of our invention:

Example 1

To 100 g. of crude tall oil contained in a glass flask was added 0.5 g. of KOH and then heated by an oil bath to a temperature of about 130° C. Ethylene oxide in the gaseous form was passed into the tall oil until approximately 134 g. of ethylene oxide had combined with the oil. The condensation product so obtained was a dark, pleasant-smelling oily product which was soluble in water.

Twenty parts by weight of the condensation product so produced was mixed with 40 parts by weight of tetrasodium pyrophosphate and 40 parts of sodium sulfate. In hard water the composition exhibited a relative detergency of 123% and only a trace of suds.

Example 2

The condensation of tall oil with ethylene oxide was conducted until 1.6 parts of ethylene oxide had combined per part of tall oil. The following composition was then prepared:

| | Parts |
|---|---|
| Condensation product containing 1.6 parts ethylene oxide per part of tall oil | 15 |
| Sodium carbonate | 40 |
| Tetrasodium phosphate | 40 |
| Carboxymethylcellulose | 5 |
| Total | 100 |

The relative detergency of the above composition was found to be 124% in 50 p. p. m. water and 118% in 300 p. p. m. water.

Example 3

An additional composition was prepared utilizing the following ingredients in the proportions stated:

| | Parts |
|---|---|
| Condensation product described in Example 2 | 20 |
| Tetrasodium pyrophosphate | 40 |
| Sodium sulfate | 30 |
| Sodium carbonate | 6 |
| Carboxymethylcellulose | 4 |
| Total | 100 |

This composition exhibited a relative detergency of 126% in 50 p. p. m. water and 120% in 300 p. p. m. water.

Example 4

A further composition having the following ingredients was prepared:

| | Parts |
|---|---|
| Condensation product described in Example 2 | 25 |
| Sodium tripolyphosphate | 40 |
| Sodium sulfate | 25 |
| Sodium carbonate | 8 |
| Carboxymethylcellulose | 2 |
| Total | 100 |

Example 5

Another composition was prepared having the following proportions:

| | Parts |
|---|---|
| Condensation product described in Example 2 | 30 |
| Trisodium phosphate | 40 |
| Sodium sulfate | 28 |
| Carboxymethylcellulose | 2 |
| Total | 100 |

The present application is a continuation-in-part of our application Serial No. 637,096, filed December 22, 1945, now abandoned.

What we claim is:

1. A detergent composition comprising in parts by weight from 15 to 30 parts of the condensation product of tall oil with ethylene oxide, said condensation product containing at least 0.5 part, but less than 2.3 parts, of condensed ethylene oxide per part of tall oil, from 20 to 50 parts, anhydrous basis, of a sodium phosphate selected from the group consisting of trisodium phosphate, sodium tripolyphosphate, tetrasodium pyrophosphate and sodium hexametaphosphate and mixtures thereof, and from 20 to 40 parts, anhydrous basis, of a non-phosphate salt selected from the group consisting of soda ash, sodium sesquicarbonate, sodium sulfate and sodium borate and mixtures thereof and from 0.1 part to 5 parts of carboxymethylcellulose.

2. A detergent composition comprising in parts by weight from 15 to 30 parts of the condensation product of tall oil with ethylene oxide, said condensation product containing at least 0.5 part but less than 2.3 parts of condensed ethylene oxide per part of tall oil, from 20 to 50 parts, anhydrous basis, of tetrasodium pyrophosphate, from 20 to 40 parts, anhydrous basis, of sodium sulfate and from 0.1 to 5 parts of carboxymethylcellulose.

3. A detergent composition comprising in parts by weight from 15 to 30 parts of the condensation product of tall oil with ethylene oxide, said condensation product containing at least 0.5 part, but less than 2.3 parts, of condensed ethylene oxide per part of tall oil, from 20 to 50 parts, anhydrous basis, of sodium tripolyphosphate, from 20 to 40 parts, anhydrous basis, of sodium sulfate and from 0.1 part to 5 parts of carboxymethylcellulose.

4. A detergent composition comprising in parts by weight from 15 to 30 parts of the condensation product of tall oil with ethylene oxide, said condensation product containing at least 0.5 part, but less than 2.3 parts, of condensed ethylene oxide per part of tall oil, from 20 to 50 parts, anhydrous basis, of trisodium phosphate, from 20 to 40 parts, anhydrous basis, of sodium sulfate and from 0.1 part to 5 parts of carboxymethylcellulose.

5. A detergent composition comprising in parts by weight from 15 to 30 parts of the condensation product of tall oil with ethylene oxide, said condensation product containing at least 0.5 part, but less than 2.3 parts of condensed ethylene oxide per part of tall oil, from 20 to 50 parts, anhydrous basis, of tetrasodium pyrophosphate, from 20 to 40 parts, anhydrous basis, of sodium sesquicarbonate and from 0.1 part to 5 parts of carboxymethylcellulose.

MILTON KOSMIN.
JAY C. HARRIS.

REFERENCES CITED

The following references are of record in the file of this patent:

UNITED STATES PATENTS

| Number | Name | Date |
|---|---|---|
| 2,335,194 | Nuesslein et al. | Nov. 23, 1943 |

FOREIGN PATENTS

| Number | Country | Date |
|---|---|---|
| 469,334 | Great Britain | July 23, 1937 |
| 498,743 | Great Britain | Jan. 9, 1939 |